No. 691,659. Patented Jan. 21, 1902.
E. H. NICHOLSON.
HAY LOADING APPARATUS.
(Application filed June 26, 1901.)
(No Model.)

Witnesses, Inventor,
Ellis H. Nicholson,
By Dewey Strong & Co.
Atty

UNITED STATES PATENT OFFICE.

ELLIS HARRY NICHOLSON, OF SANTA MARIA, CALIFORNIA.

HAY-LOADING APPARATUS.

SPECIFICATION forming part of Letters Patent No. 691,659, dated January 21, 1902.

Application filed June 26, 1901. Serial No. 66,107. (No model.)

*To all whom it may concern:*

Be it known that I, ELLIS HARRY NICHOLSON, a citizen of the United States, residing at Santa Maria, county of Santa Barbara, State of California, have invented an Improvement in Hay-Loading Apparatus; and I hereby declare the following to be a full, clear, and exact description of the same.

My invention relates to improvements in devices for loading hay upon wagons.

It consists of a buck-rake having projecting fingers and an inclined elevated rear portion, ropes having one end permanently attached to said rear portion and the other end removably secured to the points of said fingers, said ropes of approximate length with said fingers and rear portion and normally lying contiguous to said parts, and of means by which the detachable ends of said ropes may be carried upward and backward to lift the load of hay or grain from the rake and place it upon the wagon.

Figure 1:
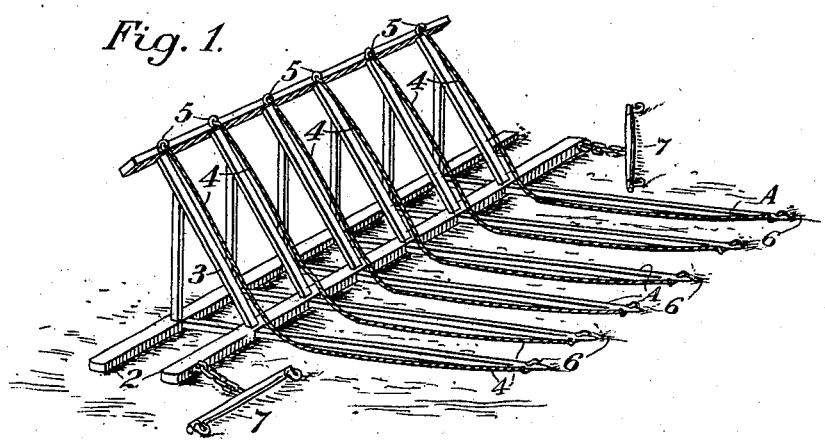
Figure 2:
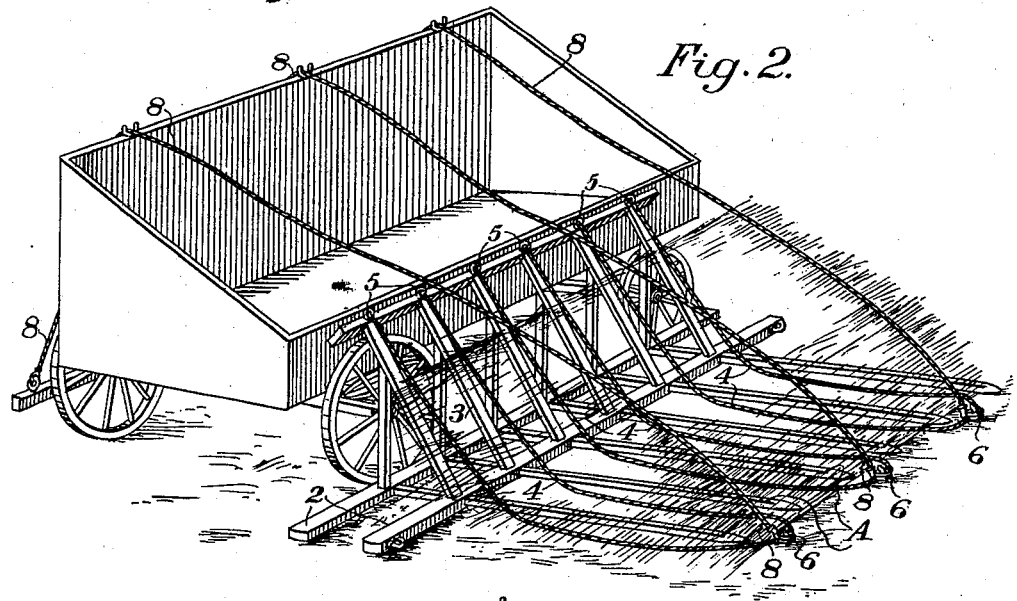
Figure 3:
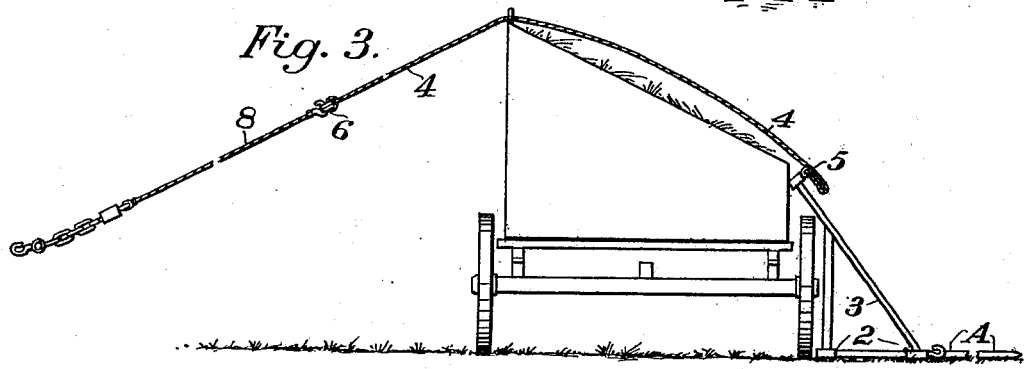

Having reference to the accompanying drawings, Figure 1 is a perspective view of my invention. Fig. 2 is a similar view illustrative of the method of delivery of a load to a wagon arranged alongside. Fig. 3 is an end view of the apparatus, showing a load delivered into a wagon.

In carrying out my invention I have shown a rake commonly known as a "buck-rake," which is adapted to gather hay lying in windrows, bunches, or gavels into large masses. This rake consists of the horizontal fingers A, united at their rear end by the cross-bars 2. To these cross-bars is suitably secured the inclined back of the rake 3. Ropes 4 have one end permanently attached at 5 to the top of said back, and their other end is provided with a hook 6 or other suitable fastening by which the ropes are detachably connected with the points of the fingers. These ropes are of a length so as normally to lie slack against the fingers and back.

As the rake is moved forward along the ground by horses, attached as at 7, a load is gradually collected. A wagon suitably adapted is then driven up to and parallel with the rear of the rake. The ropes 4 are released from the fingers and hooked onto a second set of ropes 8, which are passed over the wagon and over the hay on the rake. A pull exerted on the ropes 8 lifts the load from the rake and deposits it upon the wagon, as will be readily understood. The hooks 6 are then detached from the pull-ropes and are again secured to the fingers, and the rake is in readiness for the next load.

Having thus described my invention, what I claim as new, and desire to secure by Letters Patent, is—

1. A means for loading hay upon wagons, consisting in the combination of a rake having a horizontal portion and an upwardly-projecting rear portion, ropes fastened to the top of said rear portion and detachably secured to the forward end of said horizontal portion, said rake adapted to be moved along the ground to gather a load upon said horizontal portion and means by which the detachable ends of said ropes may be carried upward and rearward to lift the load from the rake upon the wagon.

2. A device for loading hay, grain and the like, consisting of a rake, with the horizontal fingers A, the upwardly-extending inclined back portion 3, ropes having one end fastened to the top of said back portion, and their other end detachably connected with the points of said fingers, said ropes adapted normally to lie contiguous to said fingers and back.

In witness whereof I have hereunto set my hand.

ELLIS HARRY NICHOLSON.

Witnesses:
L. P. SCARONI,
J. F. GOODWIN.